(12) United States Patent
Konuma et al.

(10) Patent No.: US 6,308,152 B1
(45) Date of Patent: Oct. 23, 2001

(54) METHOD AND APPARATUS OF SPEECH RECOGNITION AND SPEECH CONTROL SYSTEM USING THE SPEECH RECOGNITION METHOD

(75) Inventors: Tomohiro Konuma, Odawara; Hiroyasu Kuwano, Yamato, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/337,734

(22) Filed: Jun. 22, 1999

(30) Foreign Application Priority Data

Jul. 7, 1998 (JP) .................................................. 10-191196

(51) Int. Cl.[7] .................................................. G10L 15/22
(52) U.S. Cl. ......................... 704/238; 704/240; 704/255; 704/275
(58) Field of Search .................................. 704/270, 275, 704/231, 238, 236, 239, 240, 251, 252, 255, 256

(56) References Cited

U.S. PATENT DOCUMENTS

| | | | |
|---|---|---|---|
| 5,465,317 | * 11/1995 | Epstein | 704/236 |
| 5,737,489 | * 4/1998 | Chou et al. | 704/256 |
| 6,021,384 | * 2/2000 | Gorin et al. | 704/255 |
| 6,125,345 | * 9/2000 | Modi et al. | 704/240 |

FOREIGN PATENT DOCUMENTS

| | | |
|---|---|---|
| 4-255900 | 9/1992 | (JP) . |
| 4-306700 | 10/1992 | (JP) . |

OTHER PUBLICATIONS

"Unknown Utterance Rejection Using Likelihood Normalization Based on Syllable Recognition" by T. Watanabe et al; The Transactions of the Institute of Electronics, Information and Communication Engineerings; D–II vol. J75–D–II No. 12; Dec. 1992; pp. 2002–2009 (w/partial English translation).

* cited by examiner

Primary Examiner—Richemond Dorvil
(74) Attorney, Agent, or Firm—Israel Gopstein

(57) ABSTRACT

A string of acoustic feature parameters of each of recognition-desired words and a string of acoustic feature parameters of each of reception words are registered in advance. When an uttered word is received, a string of acoustic feature parameters is extracted from the uttered word, the acoustic feature parameters of the uttered word is compared with the string of acoustic feature parameters of each recognition-desired word, and a recognition-desired word recognition score indicating a similarity degree between the uttered word and each recognition-desired word is calculated. Also, a reception word recognition score indicating a similarity degree between the uttered word and each reception word is calculated. In cases where a particular recognition-desired word recognition score corresponding to a particular recognition-desired word is higher than the highest reception word recognition score, the utter word is recognized as the particular recognition-desired word, and an operation of an electric apparatus is controlled according to the particular recognition-desired word. In contrast, in cases where a particular reception word recognition score corresponding to a particular reception word is higher than the highest recognition-desired word recognition score, the utter word is recognized as the particular reception word and is rejected, so that the electric apparatus is not operated.

11 Claims, 5 Drawing Sheets

FIG. 3

| RECOGNITION-DESIRED WORDS | CHINESE CHARACTER EXPRESSION | KANA LETTER EXPRESSION | ACOUSTIC FEATURE PARAMETERS |
|---|---|---|---|
| PANA-CHAN | パナちゃん | ぱなちゃん | Pf1 |
| PANA-SUKE | パナ助 | ぱなすけ | Pf2 |
| PANA-KO | パナ子 | ぱなこ | Pf3 |

FIG. 4

| RECEPTION WORDS | CHINESE CHARACTER EXPRESSION | KANA LETTER EXPRESSION | ACOUSTIC FEATURE PARAMETERS |
|---|---|---|---|
| HACHINOHE | 八戸 | はちのへ | Pf4 |
| KESENNUMA | 気仙沼 | けせんぬま | Pf5 |
| MUTSU | 陸奥 | むつ | Pf6 |

FIG. 5

| RECOGNITION-DESIRED WORDS | CHINESE CHARACTER EXPRESSION | WORD RECOGNITION SCORES |
|---|---|---|
| PANA-CHAN | パナちゃん | 1516 |
| PANA-SUKE | パナ助 | 1408 |
| PANA-KO | パナ子 | 897 |

FIG. 6

| RECEPTION WORDS | CHINESE CHARACTER EXPRESSION | WORD RECOGNITION SCORES |
|---|---|---|
| HACHINOHE | 八戸 | 1143 |
| KESENNUMA | 気仙沼 | 1373 |
| MUTSU | 陸奥 | 368 |

FIG. 7

ARRAGEMENT OF SCORES

| RECOGNITION-DESIRED WORD RECOGNITION SCORES | | RECEPTION WORD RECOGNITION SCORES | |
|---|---|---|---|
| (PANA-CHAN) | 1516 | | |
| (PANA-SUKE) | 1408 | | |
| | | (KESENNUMA) | 1373 |
| | | (HACHINOHE) | 1143 |
| (PANA-KO) | 897 | | |
| | | (MUTSU) | 368 |

FIG. 8

ARRAGEMENT OF SCORES

| RECOGNITION-DESIRED WORD RECOGNITION SCORES | | RECEPTION WORD RECOGNITION SCORES | |
|---|---|---|---|
| | | (KESENNUMA) | 1516 |
| | | (HACHINOHE) | 1408 |
| (PANA-CHAN) | 1373 | | |
| (PANA-SUKE) | 1143 | | |
| (PANA-KO) | 897 | | |
| | | (MUTSU) | 368 |

METHOD AND APPARATUS OF SPEECH RECOGNITION AND SPEECH CONTROL SYSTEM USING THE SPEECH RECOGNITION METHOD

BACKGROUND OF THE INVENTION

1. Field of the Invention

The present invention relates to a speech recognition method and a speech recognition apparatus for recognizing an uttered word and a speech control system for controlling an electric apparatus according to the recognized word.

2. Description of the Related Art 2.1. Previously Proposed Art

In a conventional speech recognition method, voice samples of a plurality of words desired to be recognized are registered as registered words in advance in a recognition word dictionary, and a word uttered by a user is recognized by using the recognition word dictionary. In this case, because it is difficult that a user knows all words registered in the recognition word dictionary, the user cannot avoid to utter a word other than the registered words. Therefore, even though the user utters a word other than the registered words, a specific word, of which an acoustic distance from the uttered word is shortest among those of the registered words, is selected from the registered words as a recognized word. As a result, in cases where the conventional speech recognition method is used for a conventional speech control system, there is a problem that an uttered word other than the registered words is erroneously recognized and an electric apparatus controlled by the speech control system is erroneously operated.

To prevent this problem, a word recognition score indicating a degree of an acoustic distance between the uttered word and a recognized word is calculated when the recognized word is determined, and the recognized word is adopted in cases where the word recognition score is higher than a threshold value. In contrast, in cases where the word recognition score is equal to or lower than the threshold value, the recognized word is rejected. That is, the recognized word is not adopted.

Therefore, an uttered word other than the registered words is not erroneously recognized because the word recognition score for the uttered word other than the registered words is low.

2.2. Problems to be Solved by the Invention

However, in cases where the word recognition score is calculated, it is required to adjust the threshold value according to environmental conditions (for example, noise conditions) of both the user and the speech control system. Also, it is required to set the threshold value changeable according to the combination of the registered words. Accordingly, there is a problem that it is difficult that the threshold value is set so as to reliably reject an uttered word differing from any registered words and to accurately recognize an uttered word agreeing with one of the registered words.

SUMMARY OF THE INVENTION

An object of the present invention is to provide, with due consideration to the drawbacks of such a conventional speech recognition method and a conventional speech control system, a speech recognition method and a speech recognition apparatus in which an uttered word differing from any registered words is reliably rejected and an uttered word agreeing with one registered word is accurately recognized as a recognized word even though a user does not know any registered words.

Also, an object of the present invention is to provide a speech control system in which an operation of an electric apparatus is correctly controlled according to the recognized word.

The object is achieved by the provision of a speech recognition method, comprising the steps of:

registering an acoustic feature of a recognition-desired word desired to be recognized for each of a plurality of recognition-desired words;

registering an acoustic feature of a reception word differing from the recognition-desired words for each of a plurality of recognition-desired words;

receiving an utterance including an uttered word;

calculating a recognition-desired word recognition score indicating a similarity degree between the uttered word and each recognition-desired word by comparing the acoustic feature of the recognition-desired word with an acoustic feature of the uttered word;

calculating a reception word recognition score indicating a similarity degree between the uttered word and each reception word by comparing the acoustic feature of the reception word with the acoustic feature of the uttered word;

recognizing the uttered word as a particular recognition-desired word corresponding to a particular recognition-desired word recognition score in cases where the particular recognition-desired word recognition score is higher than the highest reception word recognition score; and rejecting the utterance in cases where the highest recognition-desired word recognition score is equal to or lower than the highest reception word recognition score.

Also, the object is achieved by the provision of a speech recognition apparatus, comprising:

recognition-desired word registering means for registering an acoustic feature of a recognition-desired word desired to be recognized for each of a plurality of recognition-desired words;

reception word registering means for registering an acoustic feature of a reception word differing from the recognition-desired words for each of a plurality of recognition-desired words;

word receiving means for receiving an utterance including an uttered word;

recognition-desired word recognition score calculating means for calculating a recognition-desired word recognition score indicating a similarity degree between the uttered word received by the word receiving means and each recognition-desired word registered by the recognition-desired word registering means by comparing the acoustic feature of the recognition-desired word with an acoustic feature of the uttered word;

reception word recognition score calculating means for calculating a reception word recognition score indicating a similarity degree between the uttered word received by the word receiving means and each reception word registered by the reception word registering means by comparing the acoustic feature of the reception word with the acoustic feature of the uttered word;

word recognizing means for recognizing the uttered word received by the word receiving means as a particular recognition-desired word corresponding to a particular recognition-desired word recognition score calculated by the recognition-desired word recognition score calculating means in cases where the particular recognition-desired word recognition score is higher than the highest reception word recognition score calculated by the reception word recognition score calculating means; and utterance rejecting means for rejecting the utterance received by the word receiving means in cases where the highest recognition-desired word recognition score calculated by the recognition-desired word recognition score calculating means is equal to or lower than the highest reception word recognition score calculated by the reception word recognition score calculating means.

In the above steps and configuration, in cases where an utterance including an uttered word agrees with or is most similar to a particular recognition-desired word, a particular recognition-desired word recognition score corresponding to the particular recognition-desired word becomes highest among the recognition-desired word recognition scores and the reception word recognition scores. Therefore, the uttered word is recognized as the particular recognition-desired word.

In contrast, in cases where an uttered word included in an utterance is not most similar to any recognition-desired words but agrees with or is most similar to a particular reception word, a particular reception word recognition score corresponding to the particular reception word becomes highest among the recognition-desired word recognition scores and the reception word recognition scores. Therefore, the uttered word is rejected.

Accordingly, the uttered word can be reliably recognized at a high recognition efficiency.

Also, because it is not required to set a threshold value changeable with environmental conditions for the word recognition score, the uttered word can be easily recognized.

Also, because the uttered word is rejected when the uttered word is not most similar to any recognition-desired words, an erroneous recognition of the uttered word can be reliably avoided.

The object is also achieved by the provision of a speech control system, comprising:

recognition-desired word registering means for registering an acoustic feature of a recognition-desired word desired to be recognized for each of a plurality of recognition-desired words;

reception word registering means for registering an acoustic feature of a reception word differing from the recognition-desired words for each of a plurality of recognition-desired words;

word receiving means for receiving an utterance including an uttered word;

recognition-desired word recognition score calculating means for calculating a recognition-desired word recognition score indicating a similarity degree between the uttered word received by the word receiving means and each recognition-desired word registered by the recognition-desired word registering means by comparing the acoustic feature of the recognition-desired word with an acoustic feature of the uttered word;

reception word recognition score calculating means for calculating a reception word recognition score indicating a similarity degree between the uttered word received by the word receiving means and each reception word registered by the reception word registering means by comparing the acoustic feature of the reception word with the acoustic feature of the uttered word;

word recognizing means for recognizing the uttered word received by the word receiving means as a particular recognition-desired word corresponding to a particular recognition-desired word recognition score calculated by the recognition-desired word recognition score calculating means in cases where the particular recognition-desired word recognition score is higher than the highest reception word recognition score calculated by the reception word recognition score calculating means;

utterance rejecting means for rejecting the utterance in cases where the highest recognition-desired word recognition score calculated by the recognition-desired word recognition score calculating means is equal to or lower than the highest reception word recognition score calculated by the reception word recognition score calculating means;

operation performing means for performing an operation; and control means for controlling the operation performing means to perform the operation in cases where the uttered word received by the word receiving means is recognized as the particular recognition-desired word by the word recognizing means.

In the above configuration, when the uttered word is recognized as the particular recognition-desired word, an operation of the operation performing means is performed under the control of the control means.

Accordingly, the operation of the operation performing means such as an electric apparatus can be correctly controlled according to the particular recognition-desired word.

BRIEF DESCRIPTION OF THE DRAWINGS

The objects, features and advantages of the present invention will be apparent from the following description taken in conjunction with the accompanying drawings, in which:

FIG. 3 shows a standard acoustic pattern of a recognition-desired word registered in a recognition word dictionary with Chinese characters of the word and Japanese kana letters of the word for each recognition-desired word;

FIG. 4 shows a standard acoustic pattern of a reception word registered in an out-of-vocabulary unknown word dictionary with Chinese characters of the word and Japanese kana letters of the word for each reception word;

FIG. 5 shows an example of recognition-desired word recognition scores calculated in a word recognition score calculating unit;

FIG. 6 shows an example of reception word recognition scores calculated in the word recognition score calculating unit;

FIG. 7 shows an example of the recognition-desired word recognition scores arranged in the decreasing order and the reception word recognition scores arranged in the decreasing order; and FIG. 8 shows another example of the recognition-desired word recognition scores arranged in the decreasing order and the reception word recognition scores arranged in the decreasing order.

DETAILED DESCRIPTION OF THE EMBODIMENTS

Preferred embodiments of a speech recognition method, a speech recognition apparatus and a speech control system according to the present invention are described with reference to the drawings.

Figure 1:
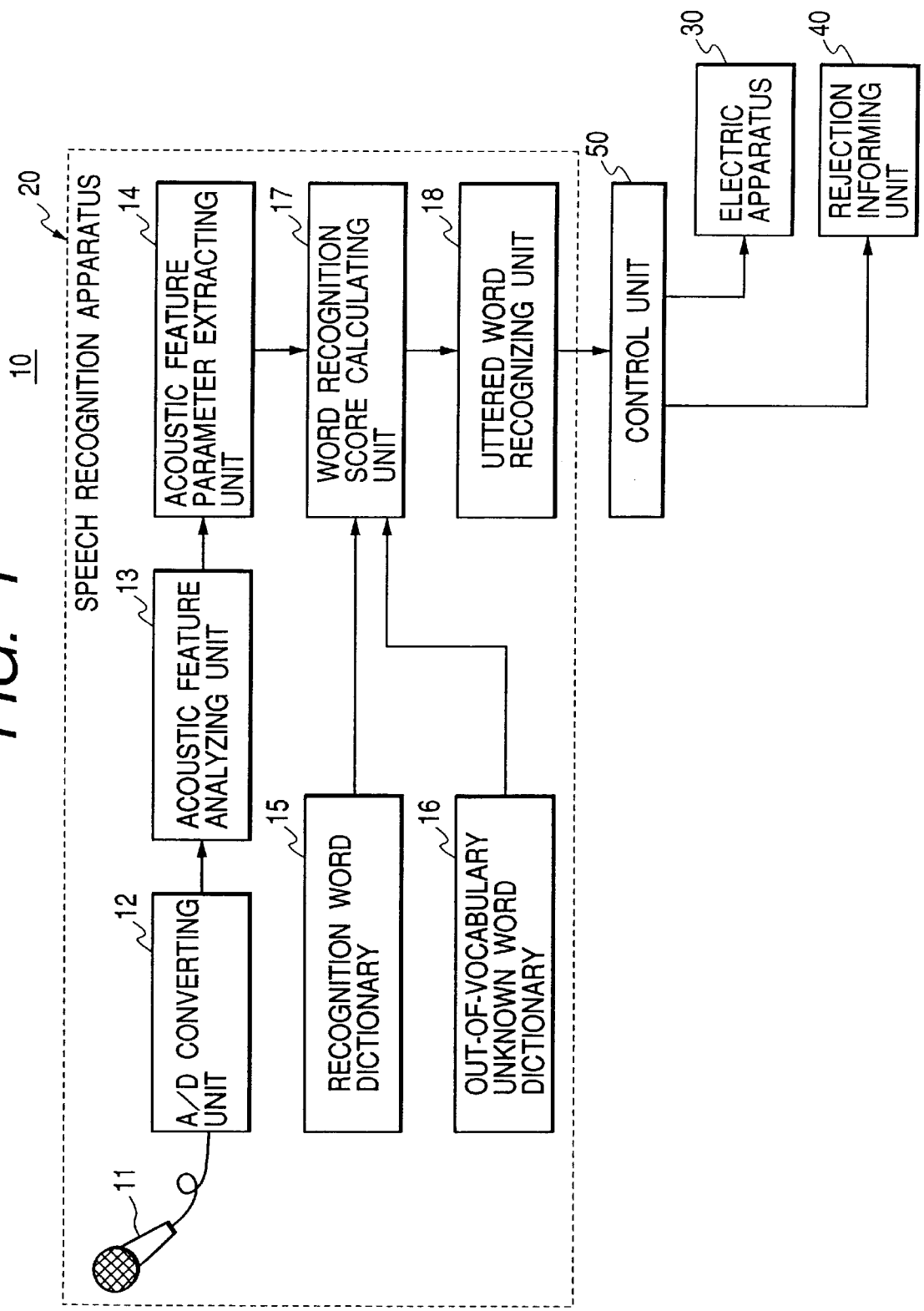
FIG. 1 is a block diagram of a speech control system, in which a speech recognition apparatus is arranged, according to an embodiment of the present invention.

FIG. 1 is a block diagram of a speech control system, in which a speech recognition apparatus is arranged, according to an embodiment of the present invention.

As shown in FIG. 1, a speech control system 10 comprises:

a speech recognition apparatus 20 for recognizing an utterance including an uttered word as a recognition-desired word in cases where the uttered word is most similar to the recognition-desired word, and rejecting an utterance including an uttered word in cases where the uttered word is not most similar to any recognition-desired word;

an electric apparatus 30, such as a lighting unit, a television unit, a channel controller of a television unit, a volume controller of a television unit and the like, for electrically performing an operation;

a rejection informing unit 40, such as a text displaying unit, a flasher unit, a buzzer, a speech synthesizing unit and the like, for informing a user that the utterance is rejected; and a control unit 50 for controlling the operation of the electric apparatus 30 according to a recognition-desired word in cases where the uttered word is recognized as the recognition-desired word in the speech recognition apparatus 20 and controlling the operation of the rejection informing unit 40 to inform a user of the rejection of the utterance in cases where the utterance is rejected in the speech recognition apparatus 20.

The speech recognition apparatus 20 comprises:

a microphone 11 for receiving an utterance including an uttered word from the user;

an analog-to-digital (A/D) converting unit 12 for converting an analog signal indicating the uttered word to a digital signal indicating the uttered word;

an acoustic feature analyzing unit 13 for analyzing acoustic features of the digital signal to obtain a string of acoustic feature parameters characterizing the uttered word;

an acoustic feature parameter extracting unit 14 for extracting the string of acoustic feature parameters from the digital signal;

a recognition word dictionary 15 for registering a string of acoustic feature parameters of a word (hereinafter called a recognition-desired word) respectively desired to be recognized for each of a plurality of recognition-desired words, each string of acoustic feature parameters being defined as a statistical expression of a standard acoustic pattern of one recognition-desired word, and the group of recognition-desired words indicating a vocabulary of the speech recognition apparatus 20;

an out-of-vocabulary unknown word dictionary 16 for registering a string of acoustic feature parameters of a reception word differing from the recognition-desired words registered in the recognition word dictionary 15 for each of a plurality of reception words, each string of acoustic feature parameters being defined as a statistical expression of a standard acoustic pattern of one reception word, the group of reception words indicating an out-of-vocabulary of the speech recognition apparatus 20, and an utterance including an uttered unknown word received in the microphone 11 being recognized as one reception word in cases where the uttered unknown word is not most similar to any recognition-desired word;

a word recognition score calculating unit 17 for comparing the string of acoustic feature parameters of the uttered word with the string of acoustic feature parameters of each recognition-desired word, comparing the string of acoustic feature parameters of the uttered word with the string of acoustic feature parameters of each reception word, calculating a recognition-desired word recognition score indicating a similarity degree between the uttered word and each recognition-desired word registered in the recognition word dictionary 15 and calculating a reception word recognition score indicating a similarity degree between the uttered word and each reception word registered in the out-of-vocabulary unknown word dictionary 16; and an uttered word recognizing unit 18 for comparing the recognition-desired word recognition scores with the reception word recognition scores, selecting one or more particular recognition-desired words corresponding to one or more particular recognition-desired word recognition scores in cases where the particular recognition-de sired word recognition scores a re higher than the highest reception word recognition score, recognizing the utterance including the uttered word as the particular recognition-desired words, and rejecting t he utterance in cases where the highest recognition-desired word recognition score is equal to or lower than the highest reception word recognition score.

Figure 2:
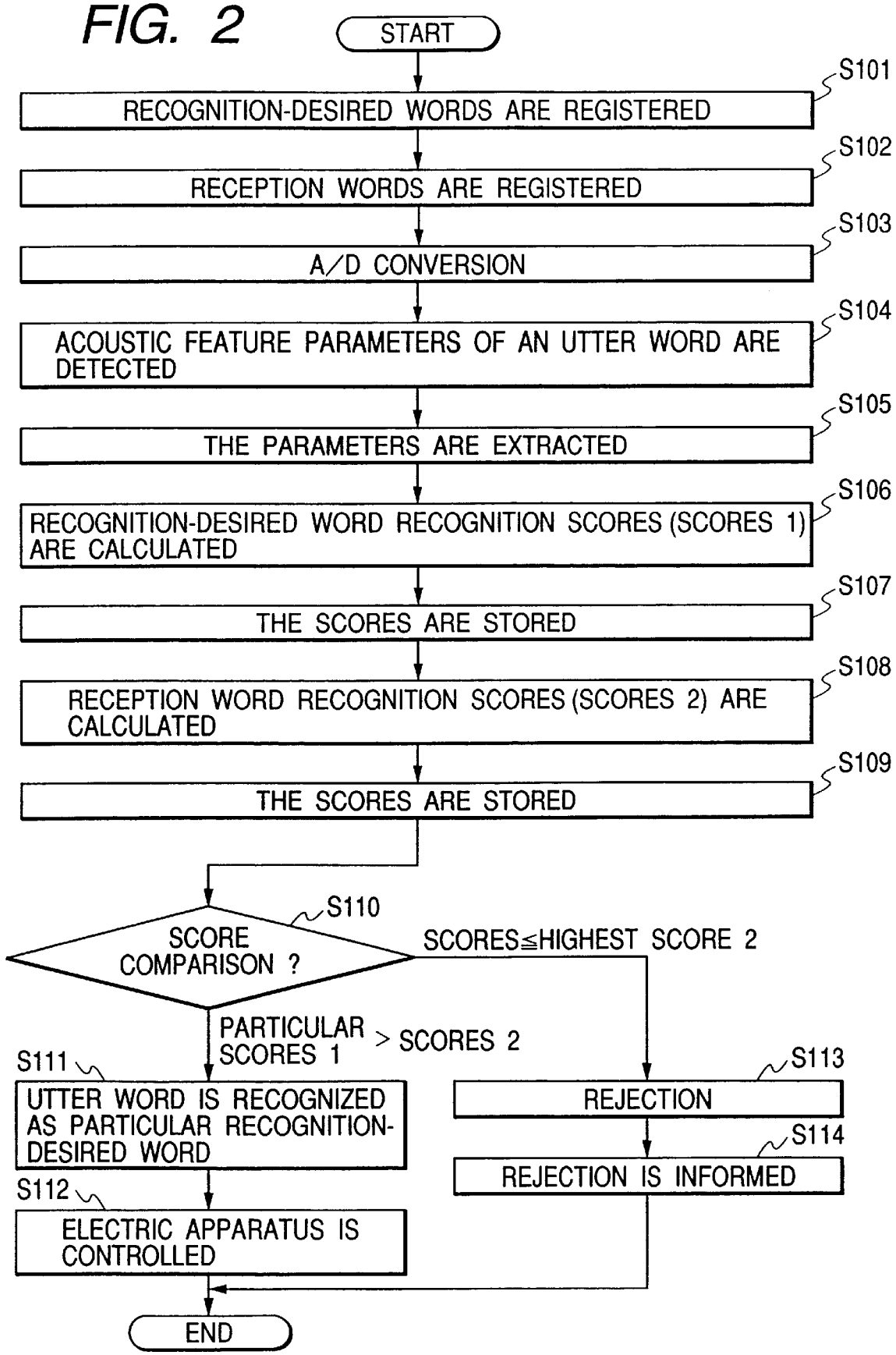
FIG. 2 is a flow chart showing an operation of the speech control system shown in FIG. 1.

In the above configuration of the speech control system 10, an operation performed in the speech control system 10 is described with reference to FIG. 2. FIG. 2 is a flow chart showing an operation of the speech control system 10.

As shown in FIG. 2, in a step S101, a series of acoustic feature parameters of a recognition-desired word is registered in the recognition word dictionary 15 with Chinese characters expressing the recognition-desired word and Japanese kana letters expressing the recognition-desired word for each of recognition-desired words. For example, as shown in FIG. 3, a series of acoustic feature parameters Pf1 of a recognition-desired word "pana-chan" is registered with Chinese characters of the word and Japanese kana letters of the word, a series of acoustic feature parameters Pf2 of a recognition-desired word "pana-suke" is registered with Chinese characters of the word and Japanese kana letters of the word, and a series of acoustic feature parameters Pf3 of a recognition-desired word "pana-ko" is registered with Chinese characters of the word and Japanese kana letters of the word.

Also, in a step S102, a series of acoustic feature parameters of a reception word differing from any recognition-desired words is registered in the out-of-vocabulary unknown word dictionary 16 with Chinese characters expressing the reception word and Japanese kana letters expressing the reception word for each of reception words. For example, as shown in FIG. 4, a series of acoustic feature parameters Pf4 of a reception word "hachinohe" denoting a Japanese city name is registered with Chinese characters of the word and Japanese kana letters of the word, a series of acoustic feature parameters Pf5 of a reception word "kesen-numa" denoting a Japanese city name is registered with Chinese characters of the word and Japanese kana letters of the word, and a series of acoustic feature parameters Pf6 of a reception word "mutsu" denoting a Japanese city name is registered with Chinese characters of the word and Japanese kana letters of the word.

Thereafter, when an utterance including a word uttered by a user is received in the microphone 11, the utterance is processed in the A/D converting unit 12. That is, the uttered word is extracted from the utterance according to a word spotting technique, and an analog-to-digital conversion is performed for the uttered word to obtain a digital signal (step S103). The digital signal is analyzed in the acoustic feature analyzing unit 13, so that a string of acoustic feature parameters characterizing the uttered word is detected (step S104). The string of acoustic feature parameters is extracted from the digital signal in the acoustic feature parameter extracting unit 14 (step S105). The string of acoustic feature parameters is expressed by a series of cepstrum coefficients indicating an N-dimensional vector.

Thereafter, in the word recognition score calculating unit 17, the string of acoustic feature parameters of the uttered word is compared with the string of acoustic feature parameters of each recognition-desired word, a statistical distance between the string of acoustic feature parameters of the uttered word and the string of acoustic feature parameters of each recognition-desired word is calculated on a statistical distance scale, and the statistical distance is set as a recognition-desired word recognition score for each recognition-desired word (step S106). The recognition-desired word recognition score is stored with the corresponding recognition-desired word expressed by the Chinese characters for each recognition-desired word (step S107). An example of the recognition-desired word recognition scores stored with the recognition-desired words is shown in FIG. 5.

Also, the string of acoustic feature parameters of the uttered word is compared with the string of acoustic feature parameters of each reception word, a statistical distance between the string of acoustic feature parameters of the uttered word and the string of acoustic feature parameters of each reception word is calculated on a statistical distance scale, and the statistical distance is set as a reception word recognition score for each reception word (step S108). The reception word recognition score is stored with the corresponding reception word expressed by the Chinese characters for each reception word (step S109). An example of the reception word recognition scores stored with the reception words is shown in FIG. 6.

Thereafter, in the uttered word recognizing unit 18, the recognition-desired word recognition scores are arranged in series in the decreasing order, the reception word recognition scores are arranged in series in the decreasing order, and the recognition-desired word recognition scores are compared with the reception word recognition scores. An example of the series of recognition-desired word recognition scores and the series of reception word recognition scores is shown in FIG. 7. Thereafter, in a step S110, it is judged whether or not one recognition-desired word recognition score higher than the highest reception word recognition score exists.

In cases where one or more particular recognition-desired word recognition scores are higher than the highest reception word recognition score (step S110), because one or more particular recognition-desired words corresponding to the particular recognition-desired word recognition scores are most similar to the uttered word as compared with any reception word, the uttered word is recognized as the particular recognition-desired words (step S111). For example, as shown in FIG. 6, because particular recognition-desired word recognition scores (scores 1) "1516" and "1408" of the particular recognition-desired words "pana-chan" and "pana-suke" are higher than the highest reception word recognition score (score 2) "1373" of the reception word "kesennuma", the uttered word is recognized as the particular recognition-desired words "pana-chan" and "pana-suke". Thereafter, the operation of the electric apparatus 30 is controlled according to the particular recognition-desired words under the control of the control unit 50 (step S112). For example, in cases where the particular recognition-desired words correspond to a word "on" (or "off"), a lighting unit or a television unit representing the electric apparatus 30 is automatically switched on (or switched off). Also, in cases where the particular recognition-desired words correspond to a word "up" (or "down") and the electric apparatus 30 is represented by a volume controller of a television unit, the volume of the television unit is automatically turn up (or turn down). Also, in cases where the particular recognition-desired words correspond to a word "change" and the electric apparatus 30 is represented by a channel controller of a television unit, the channel of the television unit is automatically changed.

In contrast, in cases where any recognition-desired word recognition scores is equal to or lower than the highest reception word recognition score (step S110), because the reception word corresponding to the highest reception word recognition score is most similar to the uttered word, it is judged that the uttered word is not any recognition-desired words, so that the uttered word is rejected (step S113). Thereafter, the electric apparatus 30 is not operated, but the rejection informing unit 40 is controlled by the control unit 50 to inform a user that the utterance is rejected. For example, as shown in FIG. 8, because the highest reception word recognition score (score 2) "1516" of the reception word "kesennuma" is higher than any recognition-desired word recognition scores (scores 1) of the recognition-desired words "pana-chan", "pana-suke" and "pana-ko", the utterance is rejected. Thereafter, the operation of the rejection informing unit 40 is controlled under the control of the control unit 50, so that the rejection of the utterance is informed the user (step S114). In this case, the electric apparatus 30 is not operated. For example, in cases where the rejection informing unit 40 is represented by a text displaying unit, a text "utterance is rejected" is displayed on the text displaying unit. Also, in cases where the rejection informing unit 40 is represented by a flasher unit, the flasher unit is switched on and off. Also, in cases where the rejection informing unit 40 is represented by a buzzer, the buzzer is rung. Also, in cases where the rejection informing unit 40 is represented by a speech synthesizing unit, a sound "utterance is rejected" is synthesized and announced by the speech synthesizing unit.

Accordingly, even though the uttered word included in the utterance differs from any of the recognition-desired words registered in the recognition word dictionary 15 because the user does not know all recognition-desired words, because a similarity degree between the utter word and each recognition-desired word and a similarity degree between the utter word and each reception word registered in the out-of-vocabulary unknown word dictionary 16 are calculated, the judgement whether or not the uttered word is most similar to one or more recognition-desired words can be performed according to the similarity degrees. Therefore, in cases where the uttered word is most similar to the recognition-desired words, the uttered word is recognized as the recognition-desired words, so that the electric apparatus 30 can be controlled according to the recognition-desired words. Also, in cases where the uttered word is not most similar to any recognition-desired word but most similar to one reception word, the utterance including the uttered word is rejected, so that an erroneous control of the electric apparatus 30 based on the utter word can be avoided.

Also, in cases where the number of reception words registered in the out-of-vocabulary unknown word dictionary 16 is sufficiently increased, even though the uttered word differing from any of the recognition-desired words is received in the microphone 11, because the uttered word can be reliably most similar to one of the reception words, the utterance including the uttered word can be reliably rejected.

Also, in cases where the uttered word received in the microphone 11 agrees with or most similar to one recognition-desired word registered in the recognition word dictionary 15, because the recognition-desired word recognition score corresponding to the recognition-desired word becomes highest among the other recognition-desired word recognition scores and the reception word recognition scores, the utter word can be reliably recognized as the recognition-desired word, so that the electric apparatus 30 can be reliably controlled according to the recognition-desired word.

Also, because words making the control unit 50 control the operation of the electric apparatus 50 are limited to the recognition-desired words registered in the recognition word dictionary 15, even though an ordinary word used in an ordinary conversation is erroneously received as an uttered word in the microphone 11, the ordinary word usually differs from the recognition-desired words, so that an erroneous control of the electric apparatus 30 can be reliably avoided.

In this embodiment, the recognition-desired words are registered as one group in the recognition word dictionary 15. However, it is applicable that the recognition-desired words of the recognition word dictionary 15 be classified into a plurality of groups. For example, in cases where an information selecting apparatus represents the electric apparatus 30, the recognition-desired words are classified into a group of words (called affirmative words) corresponding to affirmative expressions and a group of words (called denial words) corresponding to denial expressions. In this case, a plurality of recognition-desired affirmative word recognition scores corresponding to the affirmative words, a plurality of recognition-desired denial word recognition scores corresponding to the denial words and a plurality of reception word recognition scores are calculated in the uttered word recognizing unit 18. When the uttered word is recognized as one affirmative word (or one denial word), the utter word is adopted by the information selecting apparatus as an affirmative opinion (or a denial opinion) of the user.

Also, in cases where an automatic questionnaire apparatus represents the electric apparatus 30, it is applicable that the recognition-desired words be classified into a group of affirmative words corresponding to affirmative answers, a group of denial words corresponding to denial answers and a group of intermediate words corresponding to intermediate answers between the affirmative answers and the denial answers. In this case, a plurality of recognition-desired affirmative word recognition scores corresponding to the affirmative words, a plurality of recognition-desired denial word recognition scores corresponding to the denial words, a plurality of recognition-desired intermediate word recognition scores corresponding to the intermediate words and a plurality of reception word recognition scores are calculated in the uttered word recognizing unit 18. When the uttered word is recognized as one intermediate word, the utter word is adopted by the automatic questionnaire apparatus as an intermediate opinion of the user.

Also, in cases where a speech interactive type car navigation apparatus represents the electric apparatus 30, a plurality of operations (N operations) are performed in the car navigation apparatus. Therefore, it is applicable that the recognition-desired words be classified into N groups of words corresponding to the N operations. In this case, when the uttered word is recognized as one recognition-desired word corresponding to one operation, the operation is performed in the speech interactive type car navigation apparatus under the control of the control unit 50. Therefore, each of the N operations can be reliably performed in the speech interactive type car navigation apparatus.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A speech recognition method, comprising the steps of:

registering an acoustic feature of a recognition-desired word desired to be recognized for each of a plurality of recognition-desired words;

registering an acoustic feature of a reception word differing from the recognition-desired words for each of a plurality of recognition-desired words;

receiving an utterance including an uttered word;

calculating a recognition-desired word recognition score indicating a similarity degree between the uttered word and each recognition-desired word by comparing the acoustic feature of the recognition-desired word with an acoustic feature of the uttered word;

calculating a reception word recognition score indicating a similarity degree between the uttered word and each reception word by comparing the acoustic feature of the reception word with the acoustic feature of the uttered word;

recognizing the uttered word as a particular recognition-desired word corresponding to a particular recognition-desired word recognition score in cases where the particular recognition-desired word recognition score is higher than the highest reception word recognition score; and rejecting the utterance in cases where the highest recognition-desired word recognition score is equal to or lower than the highest reception word recognition score.

2. A speech recognition method according to claim 1, further comprising the step of:

informing a user that the utterance is rejected in cases where the utterance is rejected.

3. A speech recognition method according to claim 1 in which the step of calculating a recognition-desired word recognition score includes the steps of:

analyzing the acoustic feature of the uttered word;

calculating a statistical distance between the acoustic feature of the uttered word and the acoustic feature of each recognition-desired word on a statistical distance scale; and setting the statistical distance of one recognition-desired word as the recognition-desired word recognition score of the recognition-desired word for each recognition-desired word, and the step of calculating a reception word recognition score includes the steps of:

calculating a statistical distance between the string of acoustic feature of the uttered word and the acoustic feature of each reception word on a statistical distance scale; and setting the statistical distance of one reception word as the reception word recognition score of the reception word for each reception word.

4. A speech recognition apparatus, comprising:

recognition-desired word registering means for registering an acoustic feature of a recognition-desired word desired to be recognized for each of a plurality of recognition-desired words;

reception word registering means for registering an acoustic feature of a reception word differing from the recognition-desired words for each of a plurality of recognition-desired words;

word receiving means for receiving an utterance including an uttered word;

recognition-desired word recognition score calculating means for calculating a recognition-desired word recognition score indicating a similarity degree between the uttered word received by the word receiving means and each recognition-desired word registered by the recognition-desired word registering means by comparing the acoustic feature of the recognition-desired word with an acoustic feature of the uttered word;

reception word recognition score calculating means for calculating a reception word recognition score indicating a similarity degree between the uttered word received by the word receiving means and each reception word registered by the reception word registering means by comparing the acoustic feature of the reception word with the acoustic feature of the uttered word;

word recognizing means for recognizing the uttered word received by the word receiving means as a particular recognition-desired word corresponding to a particular recognition-desired word recognition score calculated by the recognition-desired word recognition score calculating means in cases where the particular recognition-desired word recognition score is higher than the highest reception word recognition score calculated by the reception word recognition score calculating means; and utterance rejecting means for rejecting the utterance received by the word receiving means in cases where the highest recognition-desired word recognition score calculated by the recognition-desired word recognition score calculating means is equal to or lower than the highest reception word recognition score calculated by the reception word recognition score calculating means.

5. A speech recognition apparatus according to claim 4, further comprising:

rejection informing means for informing a user that the utterance received by the word receiving means is rejected in cases where the utterance is rejected by the utterance rejecting means.

6. A speech recognition apparatus according to claim 4, further comprising:

acoustic feature extracting means for extracting the acoustic feature of the uttered word from the uttered word received by the word receiving means, and a statistical distance between the acoustic feature of the uttered word extracted by the acoustic feature extracting means and the acoustic feature of one recognition-desired word registered by the recognition-desired word registering means on a statistical distance scale is set as the recognition-desired word recognition score of the recognition-desired word for each recognition-desired word by the recognition-desired word recognition score calculating means, and a statistical distance between the acoustic feature of the uttered word extracted by the acoustic feature extracting means and the acoustic feature of one reception word registered by the reception word registering means on a statistical distance scale is set as the reception word recognition score of the reception word for each reception word by the reception word recognition score calculating means.

7. A speech control system, comprising:

recognition-desired word registering means for registering an acoustic feature of a recognition-desired word desired to be recognized for each of a plurality of recognition-desired words;

reception word registering means for registering an acoustic feature of a reception word differing from the recognition-desired words for each of a plurality of recognition-desired words;

word receiving means for receiving an utterance including an uttered word;

recognition-desired word recognition score calculating means for calculating a recognition-desired word recognition score indicating a similarity degree between the uttered word received by the word receiving means and each recognition-desired word registered by the recognition-desired word registering means by comparing the acoustic feature of the recognition-desired word with an acoustic feature of the uttered word;

reception word recognition score calculating means for calculating a reception word recognition score indicating a similarity degree between the uttered word received by the word receiving means and each reception word registered by the reception word registering means by comparing the acoustic feature of the reception word with the acoustic feature of the uttered word;

word recognizing means for recognizing the uttered word received by the word receiving means as a particular recognition-desired word corresponding to a particular recognition-desired word recognition score calculated by the recognition-desired word recognition score calculating means in cases where the particular recognition-desired word recognition score is higher than the highest reception word recognition score calculated by the reception word recognition score calculating means;

utterance rejecting means for rejecting the utterance in cases where the highest recognition-desired word recognition score calculated by the recognition-desired word recognition score calculating means is equal to or lower than the highest reception word recognition score calculated by the reception word recognition score calculating means;

operation performing means for performing an operation; and control means for controlling the operation performing means to perform the operation in cases where the uttered word received by the word receiving means is recognized as the particular recognition-desired word by the word recognizing means.

8. A speech control system according to claim 7 in which the recognition-desired words registered in the recognition-desired word registering means are classified into a group of affirmative words corresponding to affirmative expressions and a group of denial words corresponding to denial expressions, the operation performing means is an information selecting apparatus, the utter word received by the word receiving means is adopted as an affirmative opinion by the information selecting apparatus in cases where the uttered word is recognized as one affirmative word, and the utter word is adopted as a denial opinion by the information selecting apparatus in cases where the uttered word is recognized as one denial word.

9. A speech control system according to claim 7 in which the recognition-desired words registered in the recognition-desired word registering means are classified into a group of affirmative words corresponding to affirmative answers, a group of denial words corresponding to denial answers and a group of intermediate words corresponding to intermediate answers between the affirmative answers and the denial answers, the operation performing means is an automatic questionnaire apparatus, the utter word received by the word receiving means is adopted as one affirmative answer by the automatic questionnaire apparatus in cases where the uttered word is recognized as one affirmative word, and the utter word is adopted as one denial answer by the automatic questionnaire apparatus in cases where the uttered word is recognized as one denial word.

10. A speech control system according to claim 7 in which the recognition-desired words registered in the recognition-desired word registering means are classified into N groups of recognition-desired words corresponding to N operations (N is a positive integral number), and one operation is performed by the operation performing means in cases where the utter word received by the word receiving means is recognized as one recognition-desired word of one group corresponding to the operation.

11. A speech control system according to claim 7, further comprising:
 rejection informing means for informing a user that the utterance received by the word receiving means is rejected in cases where the uttered word is rejected by the utterance rejecting means.

* * * * *